United States Patent [19]

Takayama

[11] Patent Number: 5,400,181
[45] Date of Patent: Mar. 21, 1995

[54] LENS BARREL

[75] Inventor: Toru Takayama, Kawasaki, Japan

[73] Assignee: Nikon Corporation, Tokyo, Japan

[21] Appl. No.: 68,859

[22] Filed: May 28, 1993

[30] Foreign Application Priority Data

Jul. 10, 1992 [JP] Japan .................. 4-207497

[51] Int. Cl.$^6$ ............................................. G02B 15/14
[52] U.S. Cl. .................... 359/701; 359/700; 359/704; 359/823
[58] Field of Search ............... 359/699, 700, 701, 703, 359/704, 694, 813, 823

[56] References Cited

U.S. PATENT DOCUMENTS 4,275,952 6/1981 Uesugi ........................... 359/201

Primary Examiner—Loha Ben
Assistant Examiner—Thomas Robbins
Attorney, Agent, or Firm—Shapiro and Shapiro

[57] ABSTRACT

A lens barrel includes two movable lens groups. The outer peripheral portion of an internal lens holding ring is fitted to the inner peripheral portion of an external lens holding ring so that these two rings are slidable on each other. The external lens holding ring is formed with a guide slot with which a cam pin embedded in the internal lens holding ring engages. The cam pin engages with another guide slot formed in a different cylindrical member.

4 Claims, 5 Drawing Sheets

LENS BARREL

BACKGROUND OF THE INVENTION

1. Field of the Invention

The present invention relates generally to a lens barrel including a plurality of lens groups such as a zoom lens or the like and, more particularly, to a lens barrel having an improved device for moving the lens groups.

2. Related Background Art

A wide-spread method of moving each lens group to a predetermined position in this type of lens barrel has hitherto involved the use of guide slots and pins. According to such a method, a lens holding ring for holding the lenses is tilted due to a fitting backlash caused when its outer diametrical portion is fitted to the other fitting part. It is therefore required that a sufficient fitting length be taken so as not to cause a decline of optical performance. Further, when the plurality of lens holding rings are fitted to the inner diametrical portion of the same member, the lens barrel is constructed in such a way that the fitting part of each lens holding ring is split in the peripheral direction, and these split segments are mutually set in gaps of the other fitting member to ensure the fitting length.

FIG. 3 is a sectional view showing a conventional example of the lens barrel. FIG. 4 is a sectional view illustrating how the lens holding ring is split in the conventional example. FIG. 5 is a development elevation showing the lens holding ring in the conventional example.

A fixed drum 51 includes a mount unit, provided at its rear part, for connecting a camera body (unillustrated). A cam ring 52 is fitted to the inner portion of the fixed drum 51. A cam pin 57 embedded in the fixed drum 51 is fitted in a cam slot 52a formed in the cam ring 52, whereby the cam ring 52 is movable in the optical-axis directions while rotating about the optical axis.

A lens holding ring 53 is a member for holding a lens group I and is fitted in the inner portion of the cam ring 52. A cam pin 55 is embedded in this lens holding ring 53. The cam pin 55 penetrating a cam slot 52b engages with a rectilinear slot 51a of the fixed drum 51. The lens holding ring 53 is movable in the optical-axis directions with the aid of the cam pin 55, the cam slot 52b and the rectilinear slot 51a.

A lens holding ring 54 is a member for holding a lens group II and is fitted to the inner portion of the cam ring 52. A cam pin 56 is embedded in this lens holding ring 54. The cam pin 56 penetrating a cam slot 52c formed in the cam ring 52 engages with a rectilinear slot 51d of the fixed drum 51. The lens holding ring 54 is movable in the optical-axis directions with the aid of the cam pin 56, the cam slot 52c and the rectilinear slot 51d.

An operation ring 58 is fitted to the outer peripheral portion of the fixed drum 51. The operation ring 58 is regulated in terms of its movements in the optical-axis directions and is so supported as to be rotatable about the optical axis. The operation ring 58 includes a projection extending in the central direction. This projection 58a penetrates run-off slots 51b, 51c of the fixed drum 51 and enters a rectilinear slot 52d.

Referring next to FIGS. 4 to 6B, the problems inherent in the prior art lens barrel will be explained in detail.

In the conventional lens barrel, the lens holding ring 54 is fitted to the inner portion of the cam ring 52. The reason for this is that the fitting length can be set larger than in the arrangement of fitting the lens holding ring 54 to the inner portion of the lens holding ring 53. In this case, the construction for preventing an interference between the lens holding ring 53 and the lens holding ring 54 is that, as illustrated in FIG. 4, the respective fitting portions are split, and the gaps are mutually filled with the split segments. This arrangement induces a greater increment in quantity of the fitting backlash than in a full-periphery fitting portion.

The reason for this will be elucidated referring to FIGS. 6A and 6B. Generally, some fitting backlash is produced with respect to the cam ring 52 so that the lens holding ring 53 can be smoothly moved. If the backlash becomes large, however, the lens holding ring 53 is tilted or becomes eccentric from the optical axis. This is conducive to worsened optical performance. Now, let d be the fitting backlash, and, when splitting the fitting part, the actual fitting backlash d' (>d) is larger than the fitting backlash d.

Especially, in an optical system where the eccentric accuracy between the mutual lens groups is demanded, the conventional methods are hard to adopt. It is because the lens holding ring 53 is tilted by a quantity corresponding to the backlash d' with respect to the cam drum 52. The lens holding ring 54 is similarly tilted with respect to the cam drum 52. If tilted in opposite directions, the tilts thereof become an added value of the respective tilts enough to deviate from the demanded accuracy. The optical performance declines. Besides, the difference in attitude relative to the optical performance gets more conspicuous with a larger fitting backlash. If the difference in attitude is large, the optical performance largely fluctuates depending on the direction of the lens barrel. A quality of the product can not be ensured.

Turning to FIG. 3, a coil spring 59 is interposed between the lens holding rings 53, 54 to obviate the difference in attitude. A uniform biasing force is imparted to the lens holding rings 53, 54, with the result that they are always tilted in the same directions. The attitude-difference is thereby obviated. However, the increment in the mutual eccentric quantities still remains as it is. Further, the addition of the single coil spring 59 inevitably leads to an increase in costs.

As fully described above, according to the prior art, the fitting backlash becomes larger in the split fitting part of the lens holding ring than in the full-periphery fitting part. The eccentricity and the tilt of the lens group increase, resulting in the decline of the optical performance. Particularly, the lens system where the eccentric accuracies of the mutual lens groups are demanded presents such problems that the optical performance is hard to ensure, and the mass-productivity is insufficient.

SUMMARY OF THE INVENTION

It is a primary object of the present invention, which solves the problems described above, to provide a lens barrel capable of restraining eccentricities and tilts of mutual lens groups.

According to one aspect of the present invention, there is provided a lens barrel comprising: a fixed drum having its inner peripheral surface formed with a first guide slot; a cylindrical member so supported on the fixed drum as to be rotatable about the optical axis and movable in the optical-axis directions and formed with second and third guide slots; a first lens holding ring, fitted to the inner peripheral surface of the cylindrical member, for holding a lens group, the first lens holding ring being formed with a fourth guide slot and including a first engaging member engaging with the first and second guide slots; and a second lens holding ring, fitted to the inner peripheral surface of the first lens holding ring, for holding a lens group, the second lens holding ring including a second engaging member engaging with the third guide slot through the fourth guide slot.

As explained earlier, according to the present invention, the lens holding rings are fitted to each other. It is therefore possible to restrain the eccentricities of the mutual lenses. This is effective in the case of the lens barrel with a strictly demanded accuracy.

Further, the eccentric backlash is small. It is therefore feasible to actualize such a condition as to cause no problem in terms of a difference in attitude without thrusting the lens holding rings in fixed directions by dint of a biasing force of a spring or the like.

Moreover, it is also possible to prevent a decrease in strengths of a fixed drum and a cam drum each formed with a notched portion such as a cam slot or the like.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENT

The present invention will hereinafter be described in greater detail by way of an embodiment with reference to the drawings.

Figure 1:
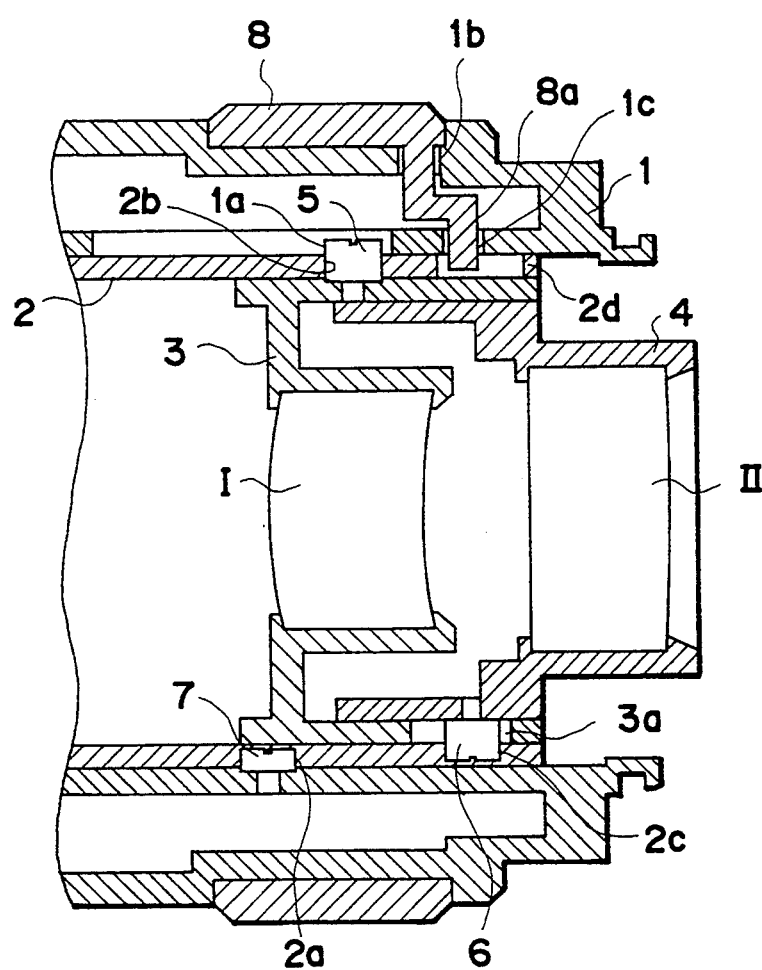
FIG. 1 is a sectional view showing an embodiment of a lens barrel according to the present invention.

FIG. 1 is a sectional view illustrating an embodiment of a lens barrel according to this invention.

A fixed drum 1 includes a mount unit, provided at its rear part, for connecting a camera body (unillustrated). A cam ring 2 engages with an internal portion of the fixed drum 1. A cam pin 7 embedded in the fixed drum 1 is fitted in a cam slot 2a, whereby the cam ring 2 is movable in the optical-axis directions while rotating about the optical axis.

A lens holding ring 3 is a member for holding a lens group I and fitted to the internal portion of the cam ring 2. A cam pin 5 is embedded in this lens holding ring 3. The cam pin 5 penetrates the cam slot 2b and enters a rectilinear slot 1a of the fixed drum 1. The lens holding ring 3 is movable in the optical-axis directions with the aid of the cam pin 5, the cam slot 2b and a rectilinear slot 1a.

A lens holding ring 4 is a member for holding a lens group II and is fitted to the internal portion of the lens holding ring 3. A cam pin 6 is embedded in this lens holding ring 4. The cam pin 6 penetrates a rectilinear slot 3a cut in the lens holding ring 3 and enters a cam slot 2c. The lens holding ring 4 is movable with the aid of the cam pin 6, the cam slot 2c and a rectilinear slot 3a.

An operation ring 8 fitted to the outer peripheral portion of the fixed drum 1. The operation ring 8 is regulated in terms of its movements in the optical-axis directions and is so supported as to be rotatable about the optical axis. The operation ring 8 includes a projection 8a extending in the central direction. This projection 8a passes through run-off slots 1b, 1c of the fixed drum 1 and enters a rectilinear slot 2d.

Figure 2:
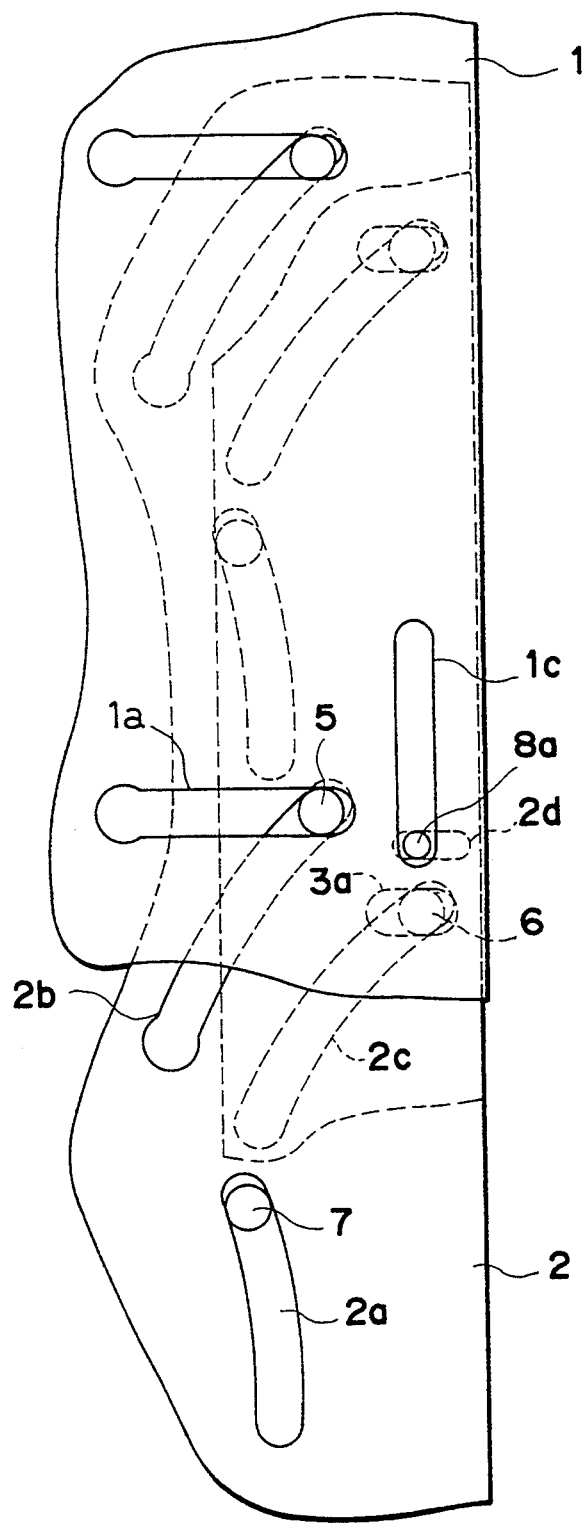
FIG. 2 is a development elevation illustrating a lens holding drum in the embodiment shown in FIG. 1.
Figure 3:
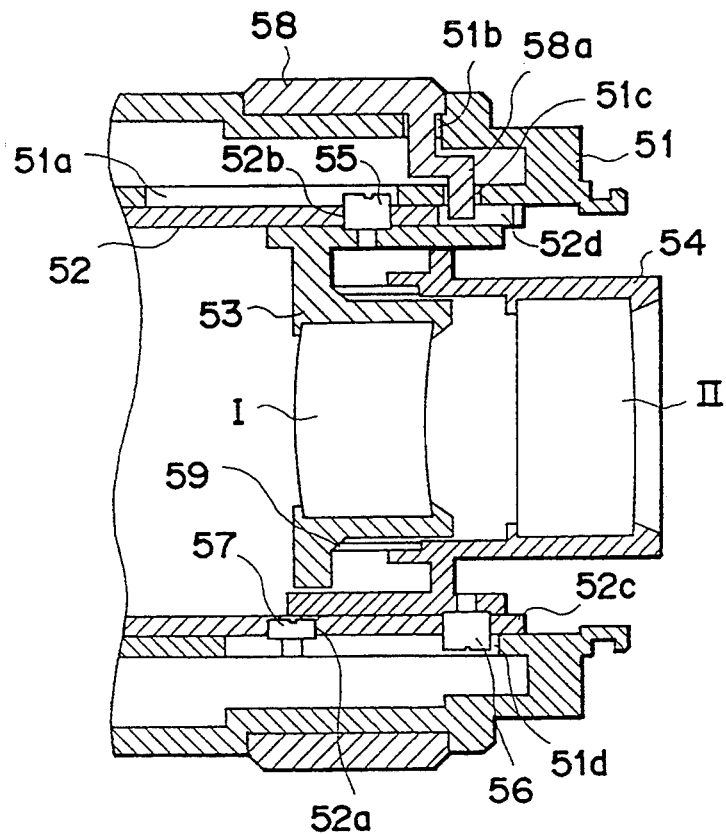
FIG. 3 is a sectional view showing an example of a prior art lens barrel.
Figure 4:
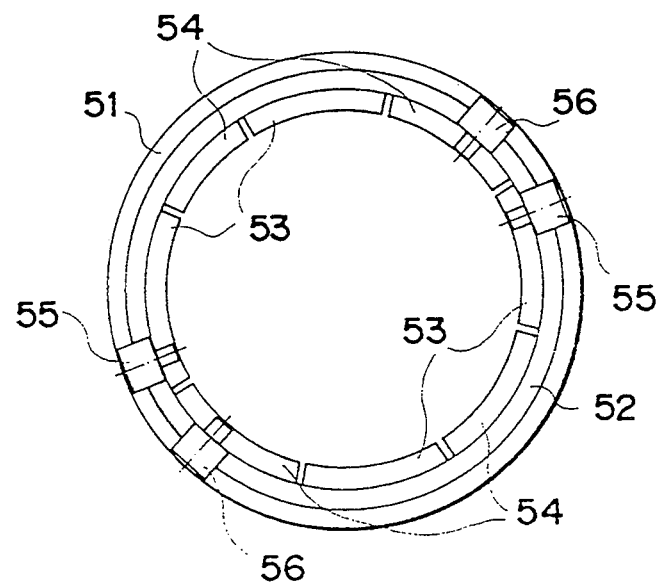
FIG. 4 is a sectional view showing how a lens holding ring is split in the conventional example.

FIG. 2 is a development elevation illustrating the lens holding ring in the embodiment shown in FIG. 1. The cam slots 2a, 2b, 2c are disposed as shown in the Figure. The cam slot 2c is constructed as a bottomed slot for ensuring a strength of the cam ring 2.

In accordance with the embodiment discussed above, the lens groups I, II are each moved to predetermined positions while rotating the operation ring 8 about the optical axis. With the rotations of the operation ring 8, the projection 8a engages with the rectilinear slot 2d. The cam ring 2 is thereby integrally rotated. At this time, the cam pin 7 for regulating the movement of the cam ring 2 engages with the cam slot 2a, whereby the cam ring 2 moves in the optical-axis direction while rotating. With the rotations of the cam ring 2, the lens holding rings 3, 4 move straight to predetermined positions when the cam pin 5 engages with the rectilinear slot 1a through the cam slot 2b and when the cam pin 6 engages with the cam slot 2c through the rectilinear slot 3a.

In accordance with this embodiment, the lens holding ring 3 is fitted directly to the lens holding ring 4. Consequently, a single fitting backlash is caused. The fitting backlash can be restrained to a value smaller than in the prior art example described above. The optical performance can be therefore easily ensured. The lens barrel can be constructed to exhibit a high mass-productivity.

Further, the fitting backlash itself is smaller than in the conventional example, and hence no problem arises in terms of a difference in attitude. The coil spring is not needed, resulting in a reduction in costs.

Further, the cam ring 52 is formed with the cam slots 52a, 52b, 52c and the rectilinear slot 52d in the prior art example, and the strength therefore declines. In accordance with this embodiment, however, the cam slot 2c can be formed as a bottomed slot. Accordingly, the strength of the cam ring 2 is enhanced.

Figure 5:
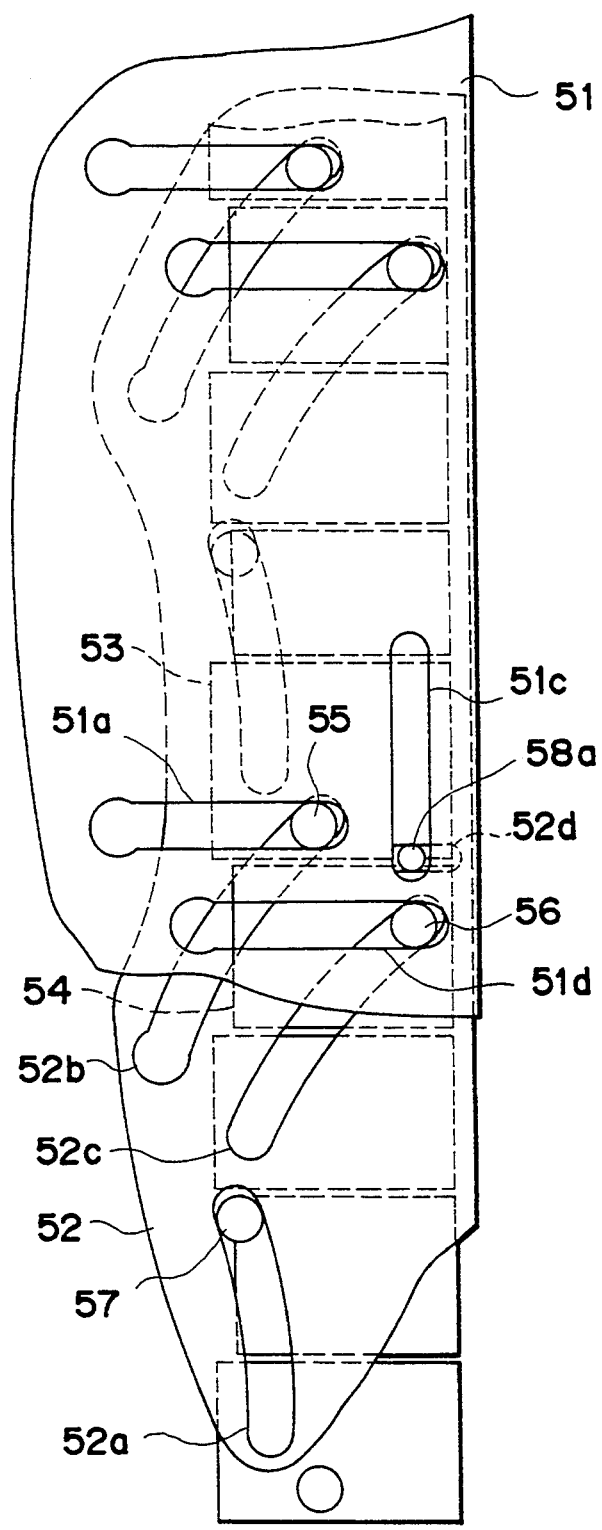
FIG. 5 is a development elevation illustrating the lens holding ring in the conventional example.
Figure 6A:
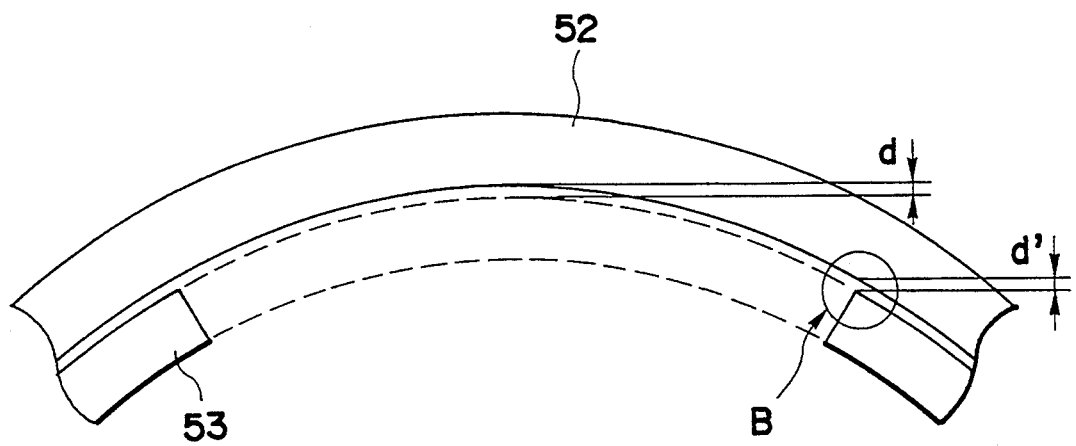
FIGS. 6A and 6B are views of assistance in explaining a difference between a backlash quantity in the embodiment and that in the conventional example.
Figure 6B:
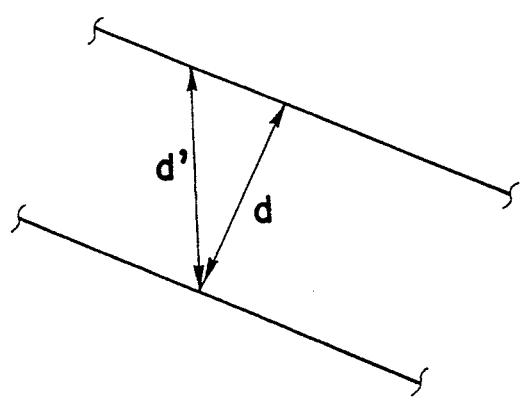

Then, in the conventional example, as illustrated in FIG. 5, the fixed drum 51 is formed with the notches such as the rectilinear slots 51a, 51d and the run-off slot 51c, resulting in a decline of the strength. The rectilinear slot 51d is not, however, required to be provided in this embodiment. The strength is therefore enhanced. Note that, instead, the rectilinear slot 3a has to be cut in the lens holding ring 3. However, the holding ring 3 has no notch other than the rectilinear slot 3a. Besides, the holding ring 3 includes the full-periphery fitting portion. Hence, there is no problem in terms of strength.

It is apparent that, in this invention, a wide range of different working modes can be formed based on the invention without deviating from the spirit and scope of the invention. This invention is not restricted by its specific working modes except being limited by the appended claims.

What is claimed is:
1. A lens barrel comprising:
   a fixed drum having an inner peripheral surface formed with a first guide slot;

a cylindrical member so supported on said fixed drum as to be rotatable about an optical axis and movable in optical-axis directions and formed with second and third guide slots;

a first lens holding ring, so fitted to the inner peripheral surface of said cylindrical member as to be movable in the optical-axis directions, for holding a lens group, said first lens holding ring being formed with a fourth guide slot and including a first engaging member engaging with said first and second guide slots; and a second lens holding ring, so fitted to the inner peripheral surface of said first lens holding ring as to be movable in the optical axis directions, for holding another lens group, said second lens holding ring including a second engaging member engaging with said third guide slot through said fourth guide slot.

2. The lens barrel according to claim 1, wherein said third guide slot is an unpenetrated slot with a bottom.

3. The lens barrel according to claim 1, further comprising an operation ring rotatably fitted to the outer portion of said fixed drum, said operation ring having an inwardly-projecting projection which penetrates a penetration run-off slot formed in said fixed drum and engages with a fifth guide slot formed in said cylindrical member.

4. The lens barrel according to claim 3, wherein said cylindrical member includes a sixth guide slot, said fixed drum includes a third engaging member engaging with said sixth guide slot, and said first through sixth guide slots are formed such that said cylindrical member rotates in cooperation with said projection and said fifth guide slot when operationally rotating said operation ring and simultaneously moves in the optical-axis directions in cooperation with said third engaging member and said sixth guide slot, and, with the rotations of said cylindrical member, said first and second lens holding ring respectively move straight in the optical-axis directions in cooperation with said first engaging member, said first guide slot and said second guide slot and in cooperation with said second engaging member, said third guide slot and said fourth guide slot.

* * * * *